United States Patent [19]

Ben-Haim

[11] Patent Number: 5,404,385

[45] Date of Patent: Apr. 4, 1995

[54] SWIMMING GOGGLE UNIT

[76] Inventor: Niv Ben-Haim, 28 Janesville Rd., Thornhill, Ontario, Canada, L4J-6Z9

[21] Appl. No.: 107,566

[22] Filed: Aug. 18, 1993

[51] Int. Cl.[6] .................. H04B 1/08; G06M 1/02; G01C 22/00
[52] U.S. Cl. ...................... 377/24.2; 377/5; 455/351; 351/158; 2/426
[58] Field of Search ............ 351/158; 377/5, 24.2; 2/426, 428, 430; 455/89, 351

[56] References Cited

U.S. PATENT DOCUMENTS

| | | | |
|---|---|---|---|
| 4,530,105 | 7/1985 | Rabinowitz | 377/624.2 |
| 4,856,086 | 8/1989 | McCullough | 455/351 |
| 4,882,769 | 11/1989 | Gallimore | 455/351 |
| 4,902,120 | 2/1990 | Weyer | 351/158 |
| 4,932,045 | 6/1990 | Kasoff et al. | 377/24.2 |
| 5,020,150 | 5/1991 | Shannon | 455/351 |
| 5,125,010 | 6/1992 | Lee et al. | 377/24.2 |

Primary Examiner—John S. Heyman
Attorney, Agent, or Firm—Terry M. Gernstein

[57] ABSTRACT

Swimming goggles include an AM/FM radio assembly as well as a lap counter. The radio assembly includes earphones that also include foam for plugging the swimmer's ear to prevent water from entering that ear. The goggles also include plastic temple pieces that serve a dual function of securely supporting the goggles on the swimmer and supporting the radio and lap counter.

3 Claims, 3 Drawing Sheets

SWIMMING GOGGLE UNIT

TECHNICAL FIELD OF THE INVENTION

The present invention relates to the general art of recreational equipment, and to the particular field of swimming equipment.

BACKGROUND OF THE INVENTION

In certain sporting events, such as swimming, athletes traverse the same course multiple times during a single workout. As a result, these athletes must maintain a count of the number of laps completed. Mentally maintaining the lap count is burdensome in that the athlete may lose track of the number of laps or may, for psychological reasons, not want to count each lap. Furthermore, the athlete may lose track of the lap count and thereby change his or her workout. This is especially true if the athlete is tired or is concentrating on his or her stroke.

Still further, many recreational swimmers swim a great number of laps using the same stroke, such as crawl, breaststroke or backstroke. Often this routine becomes boring.

Therefore, some swimmers may want some means to entertain themselves as they work out. It would be beneficial if this same means could keep track of the swimmer's lap count whereby the swimmer could concentrate on either his or here stroke or on the entertainment.

Various lap counting systems have been developed in the art. However, none of these systems satisfies all of the above-mentioned requirements. For example, some lap counting systems employ a touch pad mounted on the end of the pool which is connected to a lap display system. As the swimmer touches the touch pad, the lap count changes. This type of lap counting system has several drawbacks. For example, the pads are difficult to mount on the pool and are easily dislodged. The pads may also be expensive, and must be touched by the swimmer in a certain manner in order to register the touch. Often, lap swimmers share a lane. If the lanemate accidentally touches the touch pad, the count will be thrown off.

Still further, the art also includes proposals for radios that can be worn by a swimmer. While these devices can provide entertainment, they also have a drawback in that they are often bulky, and may become loose or dislodged during use. Therefore, the swimmer's attention is diverted, thus vitiating the entertainment value of the device. Since the swimmer must concentrate on counting laps, the entertainment value of the device is further vitiated.

Therefore, there is a need for a means for entertaining a swimmer and counting the swimmer's laps as he or she works out but, which does not distract the swimmer's attention from the entertainment.

OBJECTS OF THE INVENTION

It is a main object of the present invention to provide a swimming accessory that entertains the swimmer while he or she completes laps.

It is another object of the present invention to provide a swimming accessory that entertains a swimmer and also is used to count laps, but permits the swimmer to focus his or her attention on the entertainment.

It is another object of the present invention to provide a swimming accessory that entertains a swimmer and also is used to count laps, but permits the swimmer to focus his or her attention on the entertainment, and will not become dislodged or loose during a workout.

SUMMARY OF THE INVENTION

These, and other, objects are achieved by a goggle unit that has simple means for counting laps as well as a radio receiver assembly integral therewith. The goggle unit is securely attached to the swimmer in the manner of a normal goggle unit and thus will not become loose or dislodged during use. The lap counter assembly includes a simple manual button on the goggle unit so the swimmer needs only touch the button to change the lap count. The lap counter is electrically connected to the radio assembly to signal the swimmer via the radio assembly when a pre-set number of laps have been completed.

BRIEF DESCRIPTION OF THE DRAWING FIGURES

DETAILED DESCRIPTION OF THE PREFERRED EMBODIMENT OF THE INVENTION

Figure 1:
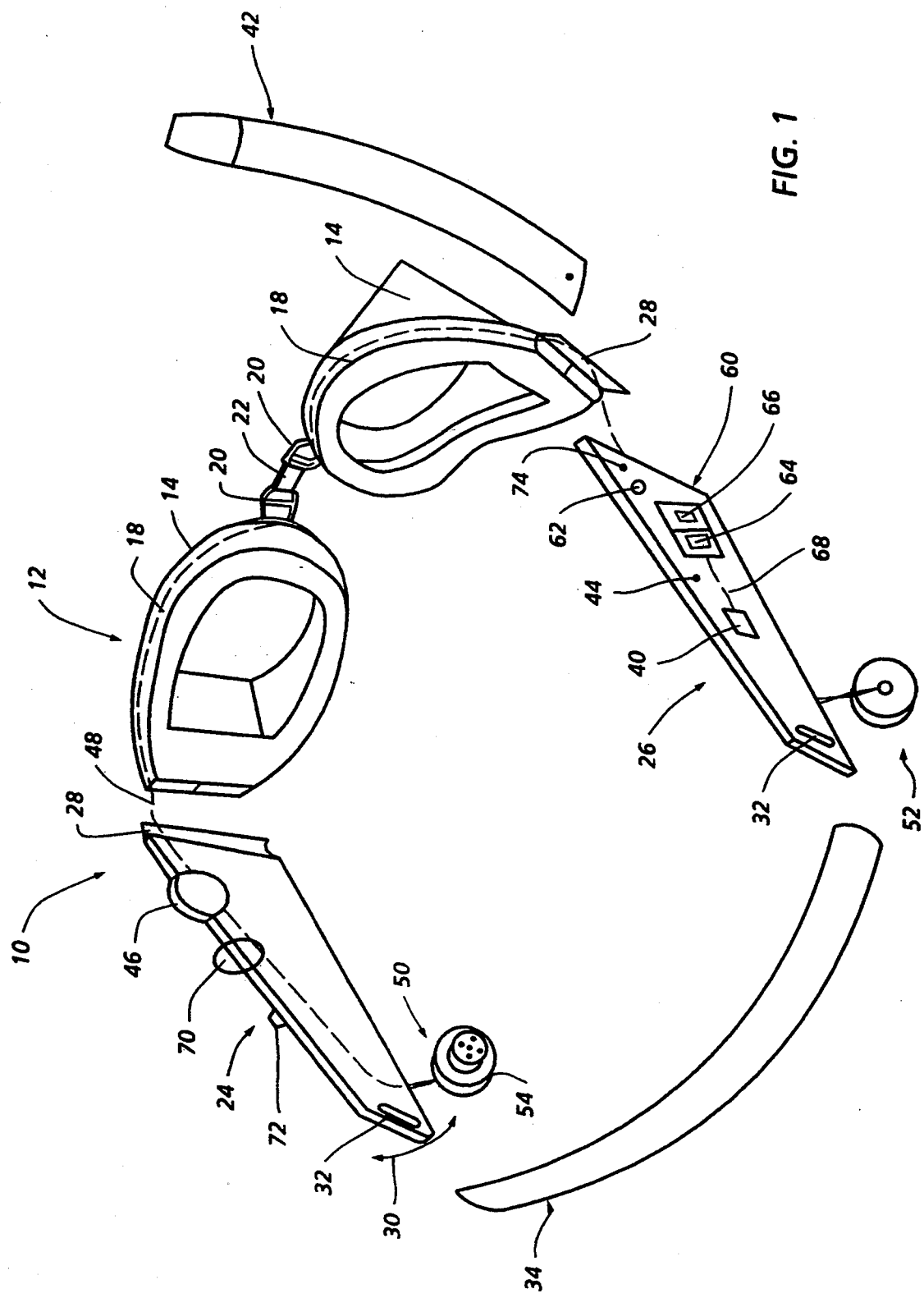
FIG. 1 is an exploded perspective of the goggle unit embodying the present invention.

Shown in FIG. 1 is a goggle unit 10 that includes an eyepiece 12 having two eyecovers 14. Each eyecover includes a lens element 16, a foam face mount 18 and a fastener element 20. A nose bridge element 22 adjustably connects the eyecovers together.

The goggle unit further includes two semi-rigid temple pieces 24 and 26 each of which is hingeably connected to an associated eyecover 12 and 14 respectively. As will be discussed below, the semi-rigidity of the temple pieces permits these elements to serve a number of functions. A living hinge, such as a continuous plastic element 28, or the like connects each temple piece to the eyecover so the temple piece can flex in direction 30 in order to fit comfortably on the wearer's face. The temple pieces are unitary and preferably are formed of plastic material. Each temple piece further includes a strap mounting hole 32 on a distal end thereof, and a flexible strap 34 is tied to each temple piece adjacent to the hole. The strap securely mounts the goggle unit to the wearer in the manner of swim goggles. Changing the length of the strap accommodates different users.

Figure 2:
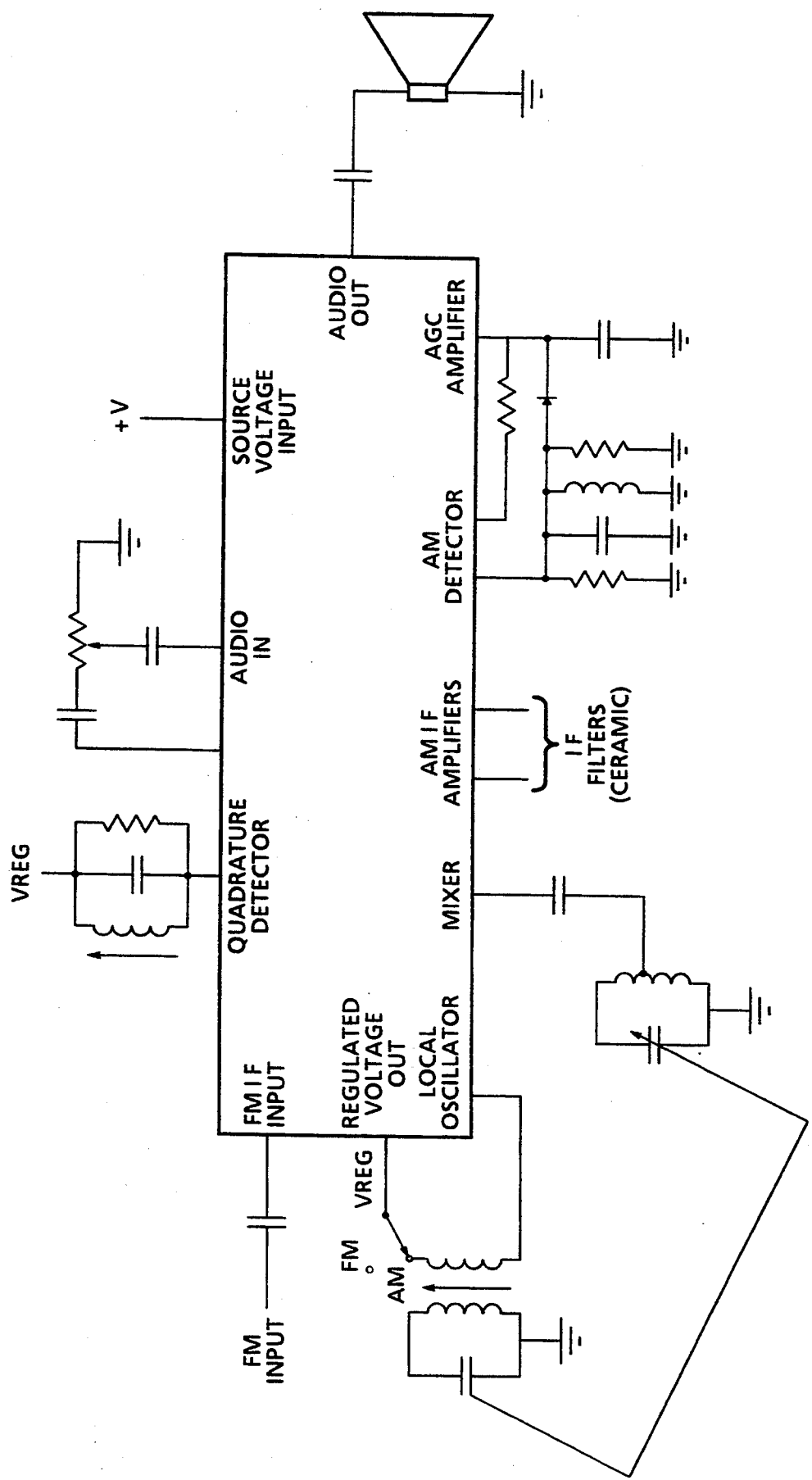
FIG. 2 is a schematic of an integrated circuit for an AM/FM radio system used in the goggle unit.

The goggle unit 10 further includes a radio receiver assembly 40 embedded in one of the temple pieces. The radio receiver assembly includes an integrated circuit chip, such as is schematically shown in FIG. 2. This chip if fully discussed in the "Encyclopedia of Integrated Circuits," Second Edition published by Prentice-Hall Electronics Library in 1987, see, especially pages 97–98. The disclosure of this Encyclopedia is incorporated herein by reference, and thus the details of the FIG. 2 circuit chip will not be presented herein. As discussed in the referenced material, a representative part number for this chip is National Semiconductor LM1868. An antenna can be embedded in the temple piece in the manner that antennas are embedded in automobile windows, or a special antenna 42 can be pivotally mounted on the temple piece by a pivot pin 44 or the like. When not in use, the antenna 42 can be folded down next to the temple piece. An on/off switch and volume control 46 is mounted on one of the temple pieces, and is connected to the chip by a suitable conductor 48. A tuning dial 70 is mounted next to control 46. An AM/FM selector 72 is mounted next to dial 70. Conductor 48 is embedded in the temple pieces, in the eyecovers and in the nose piece as well as in the hinges to connect the elements of the radio assembly located in temple piece 24 with those radio assembly elements located in temple piece 26.

The radio assembly further includes earphones 50 and 52 that are also connected to the chip via embedded conductors, such as conductor 48. The earphones also include soft rubber-like earplug material 54 so the earphones not only serve a radio function, they also serve to keep water out of the swimmer's ear.

The radio assembly can also be used so someone on deck can communicate with the swimmer via the radio receiver. The goggle unit can thus be used for coaching, teaching or the like.

Figure 3:
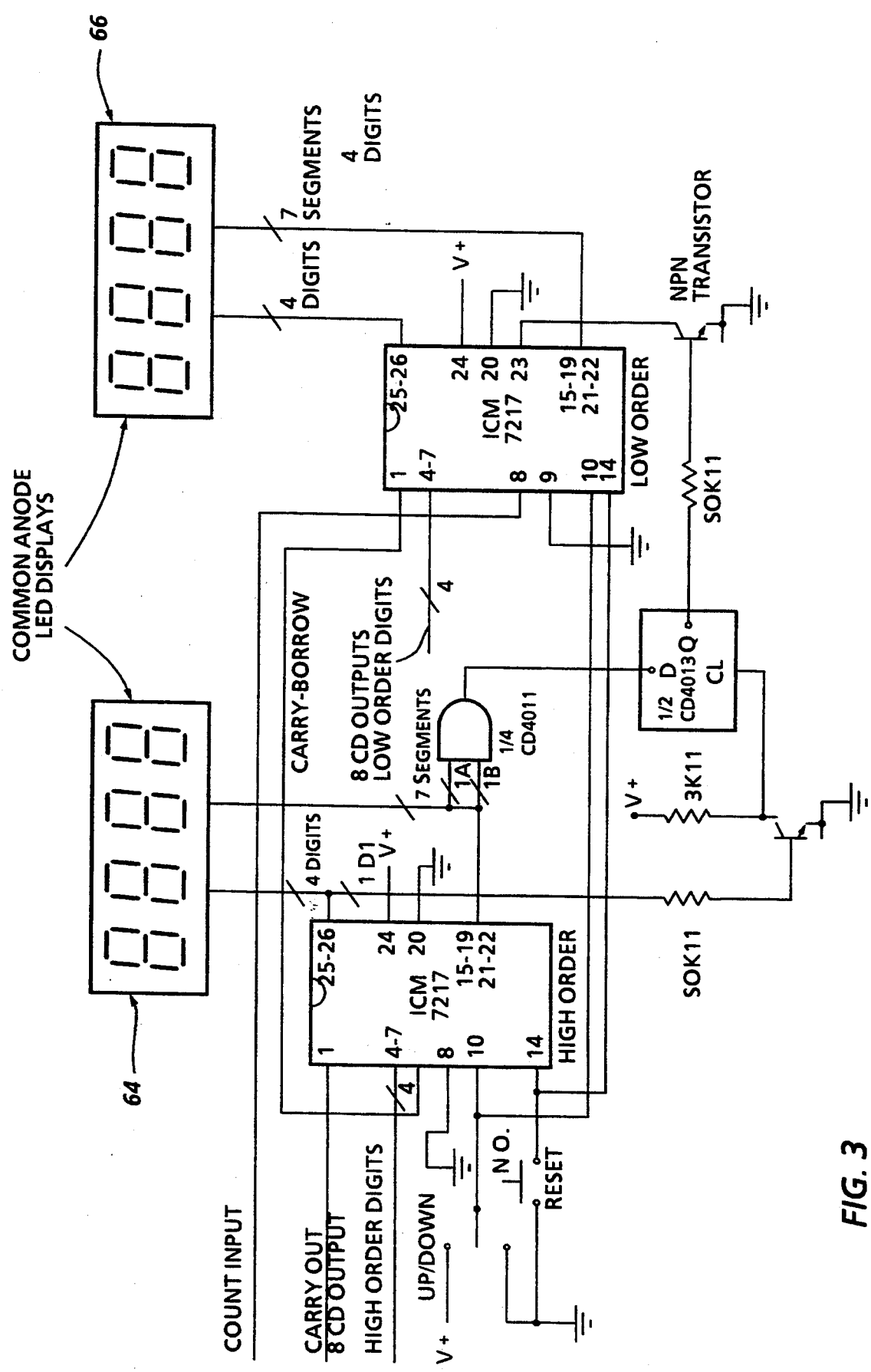
FIG. 3 is a schematic of a circuit for a lap counter used in the goggle unit.

Goggle unit 10 further includes a lap counter assembly 60. The lap counter assembly includes a circuit, such as shown in FIG. 3, and fully discussed in the "Encyclopedia of Electronic Circuits," Volume 2 by Rudolf F. Graf, published by TAB Books, Inc in 1988 (see page 134, FIG. 18-1), the disclosure of which is incorporated herein by reference. Since the referenced book discloses the counter circuit, such disclosure will not be repeated herein. The counter is controlled by manual pushbutton 62 and the pre-set is done by using control 74. The counter includes displays 64 and 66 which show the lap count. The lap counter is pushed every time a swimmer finishes a lap, and counts down from a pre-set number of laps to zero. The lap counter can also be connected to the radio assembly by a conductor 68 that is embedded in the temple piece to signal the swimmer when a preset number of laps have been completed. The counter can also include its own microphone to emit a beeping when a preset number of laps have been completed in the manner of countdown timers and the like well known to those skilled in the art and commonly used on exercise bicycles and other such equipment.

The temple pieces fit snugly against the swimmer's face. The temple pieces also serve to support the lap counter and the radio. Thus, the temple pieces serve a plurality of functions, including that of maintaining the goggle unit in position on the swimmer. Preferably, the temple pieces are formed of plastic, but can be any other solid type material that will support the radio and lap counter as well as securely yet comfortably hold the goggle unit on a swimmer's face.

It is understood that while certain forms of the present invention have been illustrated and described herein, it is not to be limited to the specific forms or arrangements of parts described and shown.

It is claimed:

1. A swimming goggle unit comprising:
   A) an eye covering assembly which includes
      (1) two eyepieces,
      (2) an adjustable nose bridge connecting said eyepieces together,
      (3) foam pads on said eyepieces for mounting said eyepieces on a swimmer's face,
      (4) two temple pieces each connected to one of said eyepieces and each including a strap engaging hole defined therethrough, and
      (5) a strap having two ends, each of which is received in one of said strap engaging holes to connect the temple pieces together and to engage a swimmer;
   B) a radio receiving assembly which includes
      (1) an AM/FM receiver mounted on one of said temple pieces, and
      (2) ear phones connected to said AM/FM receiver and mounted on said temple pieces;
      (3) an antenna having a thickness dimension and a width dimension that exceeds said thickness dimension;
      (4) mounting means for mounting said antenna on one temple piece of said temple pieces to move between a rest position next to said one temple piece with said width dimension parallel to said temple piece and a use position extending upward from said one temple piece, said mounting means including a pivot pin pivotally attaching said antenna to said one temple piece; and
   C) a lap counting assembly which includes
      (1) a counter display on one of said temple pieces, and
      (2) a manually operated button on one of said temple pieces and connected to said counter display to change the display as the swimmer completes laps.

2. The swimming goggle unit defined in claim 1 wherein said earphones include earplugging foam.

3. The swimming goggle unit defined in claim 2 wherein said temple pieces are plastic.

* * * * *